United States Patent
Ho et al.

(10) Patent No.: US 12,494,284 B2
(45) Date of Patent: Dec. 9, 2025

(54) SURGICAL GOWN TRACKING SYSTEM AND METHOD OF USING THE SAME

(71) Applicant: AI Bioelectronic Healthtech Co Ltd, Taoyuan (TW)

(72) Inventors: Yen-Yi Ho, Taoyuan (TW); Yen-Yun Huang, Hsinchu (TW)

(73) Assignee: AI Bioelectronic Healthtech Co Ltd, Taoyuan (TW)

( * ) Notice: Subject to any disclaimer, the term of this patent is extended or adjusted under 35 U.S.C. 154(b) by 260 days.

(21) Appl. No.: 18/330,708

(22) Filed: Jun. 7, 2023

(65) Prior Publication Data

US 2023/0402170 A1 Dec. 14, 2023

Related U.S. Application Data

(60) Provisional application No. 63/352,219, filed on Jun. 14, 2022.

(51) Int. Cl.
| | |
|---|---|
| G16H 40/40 | (2018.01) |
| A41D 13/12 | (2006.01) |
| G06K 7/10 | (2006.01) |
| G06K 19/02 | (2006.01) |
| G06K 19/07 | (2006.01) |
| G06K 19/077 | (2006.01) |
| G16H 40/20 | (2018.01) |

(52) U.S. Cl.
CPC ......... *G16H 40/40* (2018.01); *A41D 13/1209* (2013.01); *G06K 7/10297* (2013.01); *G06K 7/10425* (2013.01); *G06K 19/027* (2013.01); *G06K 19/0702* (2013.01); *G06K 19/0723* (2013.01); *G06K 19/07762* (2013.01); *G06K 19/07786* (2013.01); *G16H 40/20* (2018.01)

(58) Field of Classification Search
CPC ........ G16H 40/40; G16H 40/20; G16H 20/40; G16H 40/67; A41D 13/1209; G06K 7/10297; G06K 7/10425; G06K 19/027; G06K 19/0702; G06K 19/0723; G06K 19/07762; G06K 19/07786
See application file for complete search history.

(56) References Cited

U.S. PATENT DOCUMENTS

| | | | | |
|---|---|---|---|---|
| 2005/0253704 A1* | 11/2005 | Neuwirth | ............. | G06Q 10/087 340/8.1 |
| 2005/0280536 A1* | 12/2005 | Hamilton | ............. | G06Q 10/087 340/572.1 |

(Continued)

FOREIGN PATENT DOCUMENTS

CN 213487122 U * 6/2021

OTHER PUBLICATIONS

Zhao et al. Applications for Radio-frequency Identification Technology in the Perioperative Setting. AORN Journal. vol. 99, Issue 6, Jun. 2014, pp. 764-781. (Year: 2014).*

*Primary Examiner* — Linh Giang Le
(74) *Attorney, Agent, or Firm* — Best & Flanagan LLP

(57) ABSTRACT

The present invention introduces a surgical gown tracking system and method to efficiently manage and distribute surgical gowns in healthcare facilities. The system includes RFID readers, surgical gowns, and RFID tags. The method for managing and distributing surgical gowns using the surgical gown tracking system of the present invention facilitates quality control and ensures the proper processing and decontamination of gowns, enabling their reuse.

12 Claims, 3 Drawing Sheets

(56) References Cited

U.S. PATENT DOCUMENTS

2016/0189174 A1\* 6/2016 Heath ................ G06Q 30/0201
705/7.29
2020/0402653 A1\* 12/2020 Koh ....................... G16H 40/63

\* cited by examiner

SURGICAL GOWN TRACKING SYSTEM AND METHOD OF USING THE SAME

BACKGROUND OF THE INVENTION

1. Field of the Invention

The present invention relates to the field of inventory management and distribution systems for use in a surgical environment in a healthcare facility, and more particularly to the use of radio frequency identification (RFID) technology in a surgical gown tracking system and a method using the surgical gown tracking system for managing and distributing surgical gowns.

2. Description of the Prior Art

In recent years, there has been a substantial increase in the number of surgical procedures conducted across various health facilities, including small clinics, urgent care centers, and hospitals. This surge in the annual number of surgical procedures has presented challenges for health facilities in efficiently managing the supply and processing of surgical supplies, particularly surgical gowns. Consequently, health facilities have opted to outsource processing and supply chain management services to handle the processing and supply of surgical supplies, relying significantly on these services.

A surgical gown serves as a personal protective garment that healthcare workers, including surgeons and surgical staff, wear during surgical procedures. It is designed to protect both the patient and the healthcare worker from the transmission of microorganisms, body fluids, and particulate matter. The primary objective of a surgical gown is to establish a reliable liquid barrier, ensuring the safety of both parties involved. It is crucial to prioritize the protection of healthcare workers against exposure to body fluids.

Currently, disposable paper gowns are commonly used. However, manufacturers have encountered the challenge of improving the liquid barrier by incorporating plastic liners into these gowns. Unfortunately, this solution significantly compromises breathability, leading to discomfort and excessive heat for the wearer.

In recent years, advancements in fabric technology have led to the development of surgical gowns made from repellent polyester microfibers and laminated reusable materials. These gowns not only provide superior protection compared to traditional paper gowns but also offer enhanced comfort and durability. As a result, the utilization of these surgical gowns has gained significant momentum and is widely accepted and adopted.

The surgical gowns mentioned above, which are made of repellent polyester microfibers and laminated reusable fabrics, require careful laundering and sterilization following each use. This process is crucial to ensure thorough cleaning and disinfection while preserving the integrity of the fabric.

Therefore, there is an urgent need to develop a system and method that enables health facilities to monitor the usage cycles of individual surgical gowns. Furthermore, there is a need to create a surgical gown management and distribution system that incorporates data collection and information-sharing capabilities. Consequently, the inventors of the present application have dedicated significant efforts to conducting innovative research and ultimately providing a surgical gown tracking system and method that utilize RFID technology for managing and distributing surgical gowns.

The primary objective of this system and method is to facilitate real-time quality control and inspection of surgical gowns.

SUMMARY OF THE INVENTION

The primary objective of the present invention is to provide a surgical gown tracking system and method for effectively managing and distributing surgical gowns in the surgical environment of a healthcare facility. The system comprises a plurality of RFID readers, a plurality of surgical gowns, and a plurality of RFID tags. The method utilizing the system involves several steps: providing said plurality of surgical gowns securely fixed with the RFID tag by a processing and distribution facility; writing data of additional information related to a healthcare worker into the RFID tag using the RFID reader; distributing the surgical gown to the healthcare worker in a surgical environment; writing data of further information that occur during a surgical procedure; returning the surgical gown to the processing and distribution facility after use; reading out data from the RFID tag for backup or storage in a cloud platform; and processing and decontaminating the surgical gown to a condition suitable for reuse. The data resulting from the system and method can be further analyzed for quality control regarding the processing, decontamination, and condition of the surgical gown.

For achieving the primary objective mentioned above, the present invention provides an embodiment of a surgical gown tracking system. The surgical gown tracking system comprises:
  a plurality of RFID readers;
  a plurality of surgical gowns; and
  a plurality of RFID tags, wherein each RFID tag is securely fixed to each surgical gown and comprises:
  a microchip configured to store and process data;
  an antenna configured to facilitate wireless communication between each RFID tag and the RFID reader; and
  a substrate providing physical support and attachment for the microchip and the antenna.

According to the surgical gown tracking system of the present invention, each RFID tag further comprises an encapsulation layer that encapsulates the microchip, the antenna and the substrate, and the encapsulation layer is composed of a medical-grade silicone material, providing resistance to water, high temperatures, and corrosion for repeated cleaning and sterilization.

According to the surgical gown tracking system of the present invention, each RFID tag may further comprise a battery serving as a power source for the microchip, enabling autonomous operation of each RFID tag.

According to the surgical gown tracking system of the present invention, the data stored and processed by the microchip comprise manufacturing information, usage history, and maintenance records of each surgical gown.

According to the surgical gown tracking system of the present invention, each RFID tag further comprises a memory for storing additional data related to each surgical gown, including a name of the healthcare worker wearing the surgical gown and any specific procedures associated with the surgical gown.

According to the surgical gown tracking system of the present invention, the antenna of the RFID tag operates at an ultra-high frequency and supports remote reading and writing between the RFID reader and the RFID tag at a distance greater than 10 meters.

According to the surgical gown tracking system of the present invention, the microchip of the RFID tag is configured with encryption capability to prevent unauthorized access to the data, and the encryption capability is implemented in the Advanced Encryption Standard, such as AES-128 or AES-256.

According to the surgical gown tracking system of the present invention, the RFID reader located in an operating room reads and records an entry and exit time of the healthcare worker wearing the surgical gown through the RFID tag and a duration of a surgical procedure associated with the surgical gown, and monitors a location of the surgical gown in a real-time manner.

According to the surgical gown tracking system of the present invention, the microchip of the RFID tag is configured to mark the surgical gown by the RFID reader as used after it has been worn to prevent reusing the gown without proper cleaning.

According to the surgical gown tracking system of the present invention, the RFID readers are installed at an entrance and an exit of the health facility to detect a presence of the RFID tag on the surgical gown, thereby preventing theft or accidental removal of the surgical gown from the health facility.

Furthermore, the surgical gown tracking system of the present invention can be integrated with a health facility's medical device management system, allowing for real-time management of a quantity of the surgical gowns within the health facility.

According to the surgical gown tracking system of the present invention, the memory of the RFID tag can be either an EEPROM (Electrically-Erasable Programmable Read-Only Memory) or a flash memory used for storing information. The memory is divided into two parts: a read-only part and a read-write part. The read-only part stores encrypted read-only information, such as a discrete identification number assigned to the surgical gown. The read-write part is used for storing additional data related to each surgical gown, including a name of the healthcare worker wearing the surgical gown and any specific procedures associated with the gown.

The antenna is an RF interface and a small electronic device used to transmit and/or receive radio signals between the RFID tag and an RFID reader. Through the antenna, data of information can be written into and read out by the RFID reader. Furthermore, the antenna used in the present invention operates at an ultra-high frequency, enabling long communication ranges between the RFID tag and the RFID reader.

For achieving another objective, the present invention provides an embodiment of a method for managing and distributing surgical gowns using the surgical gown tracking system mentioned above, comprising the following steps:

providing said plurality of surgical gowns by a processing and distribution facility, wherein the microchip of each RFID tag securely fixed to each surgical gowns is configured to store the data of identification information, including a time of rental and a name of a health facility that rents the surgical gown;

writing the data of additional information, including a name of a healthcare worker using the surgical gown and a start time of a surgical procedure, into the microchip using the RFID reader provided by the processing and distribution facility to the health facility;

distributing the surgical gown to the healthcare worker in a surgical environment in the health facility based on the data of additional information;

writing the data of further information, including any special conditions that occur during the surgical procedure and a completion time of the surgical procedure, using the RFID reader by the health facility;

returning the surgical gown to the processing and distribution facility after use in the surgical environment;

reading out the data of identification information, additional information and further information from the microchip for backup or storage in a cloud platform by the processing and distribution facility; and processing and decontaminating the surgical gown to restore the surgical gown to a condition suitable for reuse by using the data collected from the microchip for quality control.

BRIEF DESCRIPTION OF THE DRAWINGS

The invention, along with its preferred mode of use and advantages, will be best understood by referring to the following detailed description of an illustrative embodiment, in conjunction with the accompanying drawings. The drawings include.

DETAILED DESCRIPTION OF THE PREFERRED EMBODIMENTS

To better illustrate the advantages of the surgical gown tracking system and the method for managing and distributing surgical gowns using the tracking system, as well as its contributions to the field, preferred embodiments of the present invention will be described in detail with reference to the accompanying drawings.

Figure 1:
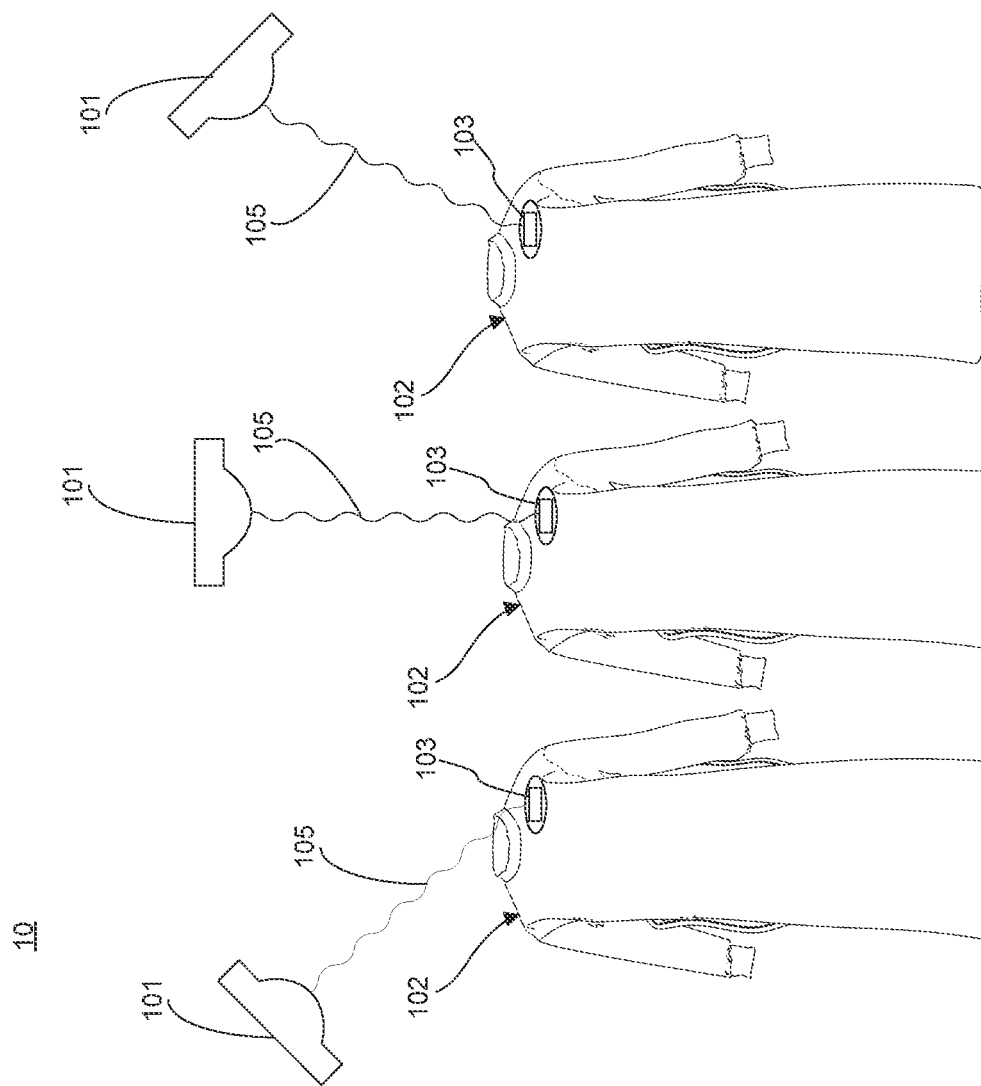
FIG. 1 shows an illustrative schematic diagram of a surgical gown tracking system according to the present invention.
Figure 2:
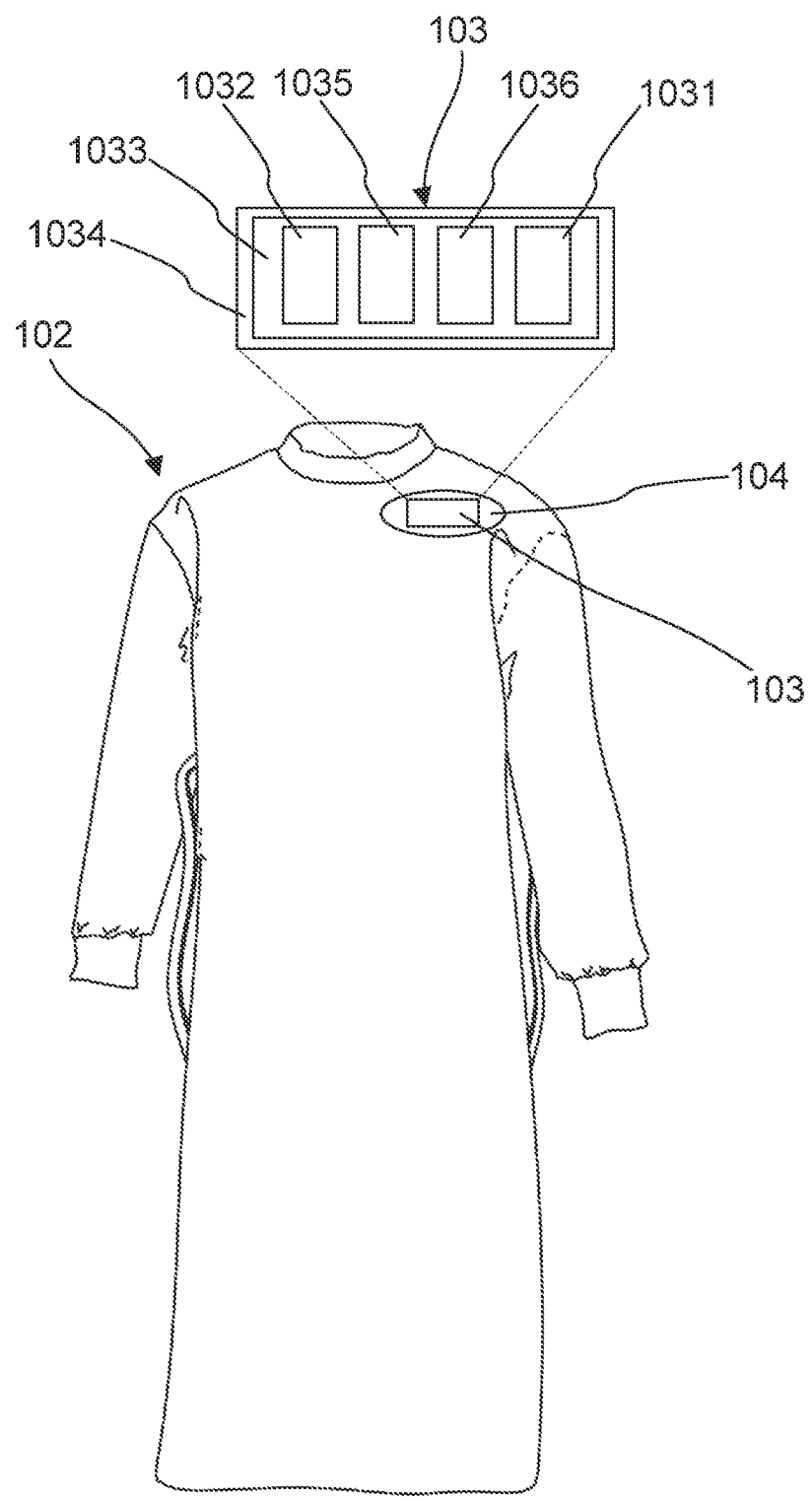
FIG. 2 shows an illustrative schematic diagram of a surgical gown with a securely fixed RFID tag.
Figure 3:
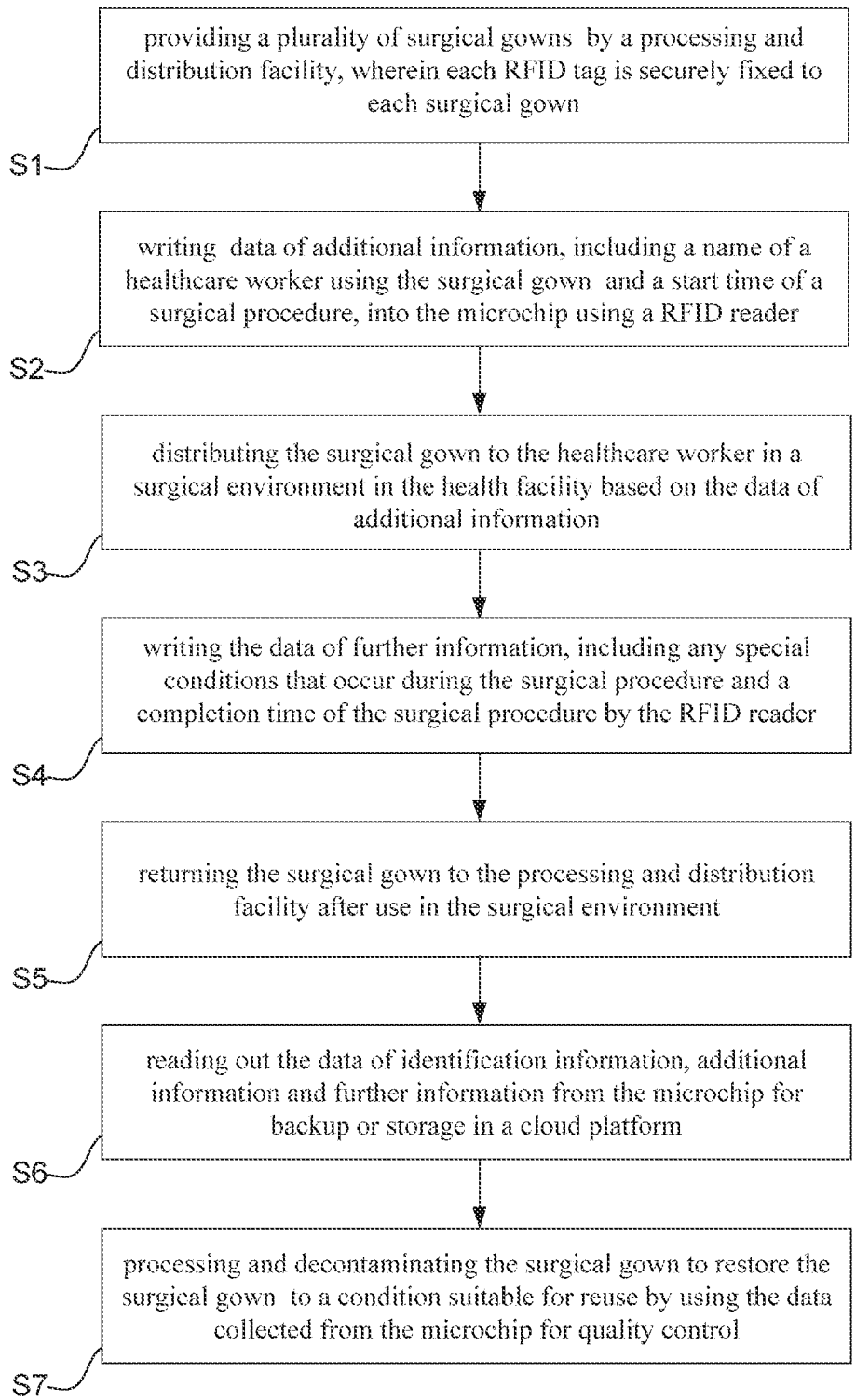
FIG. 3 shows a flowchart of a method for managing and distributing surgical gowns using the surgical gown tracking system according to the present invention in a surgical environment within a healthcare facility.

FIG. 1 is an illustrative schematic diagram showing a surgical gown tracking system 10 according to the present invention. The system comprises a plurality of RFID readers 101, a plurality of surgical gowns 102, and a plurality of RFID tags 103. Each RFID reader 101 wirelessly communicates with each RFID tag 103 through radio waves 105. FIG. 2 illustrates the surgical gown 102 securely fixed with the RFID tag 103 by using medical-grade materials 104, and the RFID tag 103 comprises a microchip 1031, an antenna 1032, a substrate 1033, an encapsulation layer 1034, a battery 1035, and a memory 1036. FIG. 3 presents a flowchart depicting the method for managing and distributing surgical gowns 102 using the surgical gown tracking system 10 according to the present invention in a surgical environment within a healthcare facility.

According to FIG. 1, the surgical gown tracking system 10 of the present invention comprises a plurality of RFID readers 101, a plurality of surgical gowns 102, and a plurality of RFID tags 103, and each RFID reader 101 wirelessly communicates with each RFID tag 103 through radio waves 105 to read out and write in data to the RFID tag 103. The RFID tag 103 is configured with encryption capability, implemented using the Advanced Encryption Standard (AES) such as AES-128 or AES-256, to prevent unauthorized access to the data, wherein the data comprise manufacturing information, usage history, and maintenance records of each surgical gown.

According to FIG. 1, the RFID tag 103 is securely fixed onto a surgical gown 102 using medical-grade materials 104, either by sewing or using glues. The RFID tag 103 comprises a microchip 1031 configured to store and process data, an antenna 1032 configured to facilitate wireless communication between each RFID tag 103 and the RFID reader 101, and a substrate 1033 providing physical support and attachment for the microchip 1031 and the antenna 1032.

Furthermore, the RFID tag 103 comprises an encapsulation layer 1034 that encapsulates the microchip 1031, the antenna 1032 and the substrate 1033. The encapsulation layer 1034 is composed of medical-grade silicone material, providing resistance to water, high temperatures, and corrosion for repeated cleaning and sterilization.

The RFID tag 103 may also incorporate a battery 1035 serving as a power source for the microchip 1031, enabling autonomous operation of each RFID tag 103. Additionally, the RFID tag 103 includes a memory 1036 for storing additional data related to each surgical gown 102, including a name of the healthcare worker wearing the surgical gown 102 and any specific procedures associated with the surgical gown 102. The substrate 1033 also provides physical support and attachment for the battery 1035 and the memory 1036, while the encapsulation layer 1034 encapsulates both the battery 1035 and the memory 1036.

The antenna 1032 of the RFID tag 103 operates at an ultra-high frequency (UHF) and supports remote reading and writing between the RFID reader 101 and the RFID tag 103 at a distance greater than 10 meters. The RFID reader 101, located in an operating room, reads and records an entry and exit time of a healthcare worker wearing the surgical gown 102 through the RFID tag 103 and a duration of a surgical procedure associated with the surgical gown 102, and monitors a location of the surgical gown 102 in a real-time manner. Furthermore, the microchip 1031 of the RFID tag 103 is configured to mark the surgical gown 102 by the RFID reader 101 as used after it has been worn to prevent reusing the surgical gown 102 without proper cleaning.

In one aspect, the RFID readers 101 can be installed at an entrance and an exit of the health facility to detect the presence of the RFID tag 103 on the surgical gown 102, thereby preventing theft or accidental removal of the surgical gown 102 from the health facility.

In another aspect, the surgical gown tracking system 10 of the present invention can be integrated with a health facility's medical device management system to enable real-time management of a quantity of the surgical gowns 102 within the health facility.

In yet another aspect, the memory 1036 of the RFID tag 103 can be either an EEPROM (Electrically-Erasable Programmable Read-Only Memory) or a flash memory used for storing information. The memory 1036 is divided into two parts: a read-only part and a read-write part. The read-only part stores encrypted read-only information, such as a discrete identification number assigned to the surgical gown 102. The read-write part is used for storing additional data related to each surgical gown 102, including a name of the healthcare worker wearing the surgical gown 102 and any specific procedures associated with the surgical gown 102.

According to FIG. 3, the method for managing and distributing surgical gowns 102 using the surgical gown tracking system 10 mentioned above comprises the following steps:

S1: providing said plurality of surgical gowns 102 by a processing and distribution facility, wherein the microchip 1031 of each RFID tag 103 securely fixed to each surgical gown 102 is configured to store the data of identification information, including a time of rental and a name of a health facility that rents the surgical gown 102;

S2: writing the data of additional information, including a name of a healthcare worker using the surgical gown 102 and a start time of a surgical procedure, into the microchip 1031 using the RFID reader 101 provided by the processing and distribution facility to the health facility;

S3: distributing the surgical gown 102 to the healthcare worker in a surgical environment in the health facility based on the data of additional information;

S4: writing the data of further information, including any special conditions that occur during the surgical procedure and a completion time of the surgical procedure, using the RFID reader 101 by the health facility;

S5: returning the surgical gown 102 to the processing and distribution facility after use in the surgical environment;

S6: reading out the data of identification information, additional information and further information from the microchip 1031 for backup or storage in a cloud platform by the processing and distribution facility; and S7: processing and decontaminating the surgical gown 102 to restore the surgical gown 102 to a condition suitable for reuse by using the data collected from the microchip 1031 for quality control.

Regarding steps S2 and S4, the RFID reader 101 can be a handheld Interrogator and therefore has the mobility for use.

Regarding steps S1 and S6, when the surgical gown 102 is provided, processed, decontaminated and inspected in the processing and distribution facility, an RFID reader 101, such as a fixed-mount interrogator, handheld interrogator, or vehicle-mound interrogator, is used to write the identification information of S1 into the microchip 1031 and read out the data of S6.

In a preferred embodiment, the RFID tag 103 of the present invention is a passive RFID tag, semi-passive RFID tag, or active RFID tag.

Preferably, the RFID tag 103 of the present invention is a passive RFID tag that transmits and writes data by inductive coupling when placed within a specific electromagnetic field generated by an RFID reader 101 at a specified frequency.

However, the electromagnetic field generated by the RFID reader 101 may interfere with medical devices within the surgical environment. Therefore, in a more preferred embodiment, the RFID tag 103 and the RFID reader 101 are configured to operate at a frequency of approximately 13.56 MHz that does not interfere with life-saving medical devices or other frequencies, such as 125~ 134 kHz (LF), 13.56 MHz (HF), 433 MHz, 855~966 MHz (UHF), and 2.45 GHz, according to the regulation of the Radio Regulatory body in each country.

In a nutshell, the above descriptions have thoroughly introduced the surgical gown tracking system and method for managing and distributing surgical gowns using the surgical gown tracking system according to the present invention. The above descriptions are made on embodiments of the present invention; however, the embodiments are not intended to limit the scope of the present invention, and all equivalent implementations or alterations within the spirit of the present invention still fall within the scope of the present invention.

What is claimed is:

1. A surgical gown tracking system comprising:
   a plurality of RFID readers;
   a plurality of surgical gowns; and
   a plurality of RFID tags, wherein each RFID tag is securely fixed to each surgical gown and comprises:
   a microchip configured to store and process data;
   an antenna configured to facilitate wireless communication between each RFID tag and the RFID reader;
   a substrate providing physical support and attachment for the microchip and the antenna; and
   a memory, divided into a read-only part and a read-write part, wherein the read-only part is used for storing a discrete identification number assigned to the surgical gown, and the read-write part is used for storing additional data related to each surgical gown, including a name of a healthcare worker wearing the surgical gown and any specific procedures associated with the surgical gown.

2. The surgical gown tracking system of claim 1, wherein each RFID tag comprises an encapsulation layer that encapsulates the, the antenna and the substrate.

3. The surgical gown tracking system of claim 2, wherein the encapsulation layer is composed of a medical-grade silicone material, providing resistance to water, high temperatures, and corrosion for repeated cleaning and sterilization.

4. The surgical gown tracking system of claim 1, wherein each RFID tag may further comprise a battery serving as a power source for the microchip, enabling autonomous operation of each RFID tag.

5. The surgical gown tracking system of claim 1, wherein the data comprise manufacturing information, usage history, and maintenance records of each surgical gown.

6. The surgical gown tracking system of claim 1, wherein the antenna operates at an ultra-high frequency and supports remote reading and writing between the RFID reader and the RFID tag at a distance greater than 10 meters.

7. The surgical gown tracking system of claim 1, wherein the RFID tag is configured with encryption capability to prevent unauthorized access to the data.

8. The surgical gown tracking system of claim 1, wherein the RFID reader located in an operating room, and used for reading and recording an entry and exit time of a healthcare worker wearing the surgical gown through the RFID tag and a duration of a surgical procedure associated with the surgical gown, and used for monitoring a location of the surgical gown in a real-time manner.

9. The surgical gown tracking system of claim 1, wherein the microchip of the RFID tag is configured to mark the surgical gown by the RFID reader as used after it has been worn to prevent reusing the surgical gown without proper cleaning.

10. The surgical gown tracking system of claim 1, wherein the RFID readers are installed at an entrance and an exit of the health facility to detect a presence of the RFID tag on the surgical gown, thereby preventing theft or accidental removal of the surgical gown from the health facility.

11. The surgical gown tracking system of claim 1, further integrating with a health facility's medical device management system to enable real-time management of a quantity of the surgical gowns within the health facility.

12. A method for managing and distributing surgical gowns using the, applied to a surgical gown tracking system, wherein the surgical gown tracking system comprises a plurality of RFID readers, a plurality of surgical gowns and a plurality of RFID tags, each RFID tag comprises a microchip, the method comprising the following steps:
   providing said plurality of surgical gowns by a processing and distribution facility, wherein the microchip of each RFID tag securely fixed to each surgical gown is configured to store the data of identification information, including a time of rental and a name of a health facility that rents the surgical gown;
   writing the data of additional information, including a name of a healthcare worker using the surgical gown and a start time of a surgical procedure, into the microchip using the RFID reader provided by the processing and distribution facility to the health facility;
   distributing the surgical gown to the healthcare worker in a surgical environment in the health facility based on the data of additional information;
   writing the data of further information, including any special conditions that occur during the surgical procedure and a completion time of the surgical procedure, using the RFID reader by the health facility;
   returning the surgical gown to the processing and distribution facility after use in the surgical environment;
   reading out the data of identification information, additional information and further information from the microchip for backup or storage in a cloud platform by the processing and distribution facility; and
   processing and decontaminating the surgical gown to restore the surgical gown to a condition suitable for reuse by using the data collected from the microchip for quality control.

* * * * *